United States Patent [19]

Kishi et al.

[11] Patent Number: 4,644,460
[45] Date of Patent: Feb. 17, 1987

[54] CUTTING DIRECTION INPUT METHOD IN AUTOMATIC PROGRAMMING

[75] Inventors: Hajimu Kishi; Kunio Tanaka; Takashi Takegahara, all of Tokyo, Japan

[73] Assignee: Fanuc Ltd, Minamitsuru, Japan

[21] Appl. No.: 682,008

[22] PCT Filed: Mar. 27, 1984

[86] PCT No.: PCT/JP84/00135
§ 371 Date: Nov. 28, 1984
§ 102(e) Date: Nov. 28, 1984

[87] PCT Pub. No.: WO84/03957
PCT Pub. Date: Oct. 11, 1984

[30] Foreign Application Priority Data
Mar. 28, 1983 [JP] Japan .................. 58-052017

[51] Int. Cl.⁴ .................................... G06F 15/46
[52] U.S. Cl. .......................... 364/171; 318/568; 340/709; 364/191; 364/474; 364/475
[58] Field of Search .................... 364/167–171, 364/188, 189, 191–193, 474, 475; 318/568; 340/706, 707, 708, 709

[56] References Cited

U.S. PATENT DOCUMENTS

| | | | |
|---|---|---|---|
| 3,757,095 | 9/1973 | Kiwiet | 364/171 X |
| 4,490,781 | 12/1984 | Kishi et al. | 364/171 X |
| 4,495,491 | 1/1985 | Postl | 340/709 |
| 4,530,046 | 7/1985 | Munekata et al. | 364/171 X |
| 4,530,061 | 7/1985 | Henderson et al. | 364/475 |

Primary Examiner—Joseph Ruggiero
Attorney, Agent, or Firm—Staas & Halsey

[57] ABSTRACT

A cutting direction input method in automatic programming for deciding a path cutting direction, includes the following steps. A path trajectory comprising a number of path blocks ($b_1 \sim b_{15}$), is displayed on a display screen (105) by using path data, and a path starting point side ($P_2$) or path end point side ($P_{15}$) is indicated by a cursor (CSR). The cutting direction is entered by operating a cutting direction input switch when the path starting point side ($P_2$) is being indicated by the cursor (CSR), in a case where cutting is to be performed from the path starting point ($P_1$) toward the path end point ($P_{16}$). The cutting direction is entered by operating the cutting direction input switch when the path end point side ($P_{15}$) is being indicated by the cursor (CSR), in a case where cutting is to be performed from the path end point ($P_{16}$) toward the path starting point ($P_1$).

7 Claims, 5 Drawing Figures

CUTTING DIRECTION INPUT METHOD IN AUTOMATIC PROGRAMMING

CROSS-REFERENCE TO RELATED APPLICATION

This application is related to my U.S. application Ser. No. 680,252 filed Nov. 28, 1984.

BACKGROUND OF THE INVENTION

This invention relates to a cutting direction input method in an automatic programming apparatus for creating an NC tape (NC data). More particularly, the invention relates to a cutting direction input method in which a path trajectory is displayed on a cathode-ray tube by using previously created path data, and a cutting path is entered by using a cursor.

A variety of automatic programming units have recently been put into practical use for the purpose of creating NC tapes (NC data) in a simple manner. With these automatic programming units, path data specifying a path can be simply created. NC data for a path are created by providing an automatic programming unit with successive inputs of shape data along a path in a cutting direction while a design drawing is observed. Accordingly, in the prior art, the shape data must be entered by following the actual cutting direction even though there may be cases where, depending upon the design drawing, it is easier to enter the shape data in a direction opposite to that of the actual cutting direction. With the conventional method, therefore, entry of the shape data cannot be carried out with facility.

SUMMARY OF THE INVENTION

It is an object of the present invention to provide a cutting direction input method for automatic programming, in which shape data can be entered without relation to the actual cutting direction while one views a design drawing, with the result that the data input can be performed while one views the design drawing in a direction which facilitates the input of the shape data, the data input being realized in a simple manner.

Another object of the present invention is to provide a cutting direction input method in automatic programming, in which a path trajectory is displayed on a display screen on the basis of entered data and a cutting path is entered by designating a path starting point side or end point side with a cursor.

The present invention provides a machining direction input method which includes displaying a path trajectory comprising a number of path blocks on a display screen by using path data, indicating one of a path starting point side and path end point side by a cursor, and entering cutting direction by operating a cutting direction input switch when the path starting point side is being indicated by the cursor in a case where cutting is to be performed from the path starting point toward the path end point, and operating the cutting direction input switch when the path end point side is being indicated by the cursor in a case where cutting is to be performed from the path end point toward the path starting point.

DETAILED DESCRIPTION OF THE PREFERRED EMBODIMENTS

Figure 1:
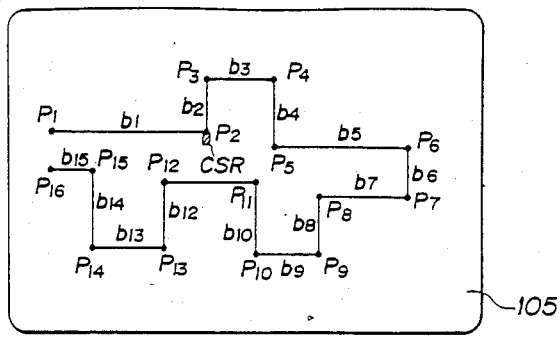
FIG. 1 is a diagram of a path trajectory and is useful in describing the method of the present invention.
Figure 2:
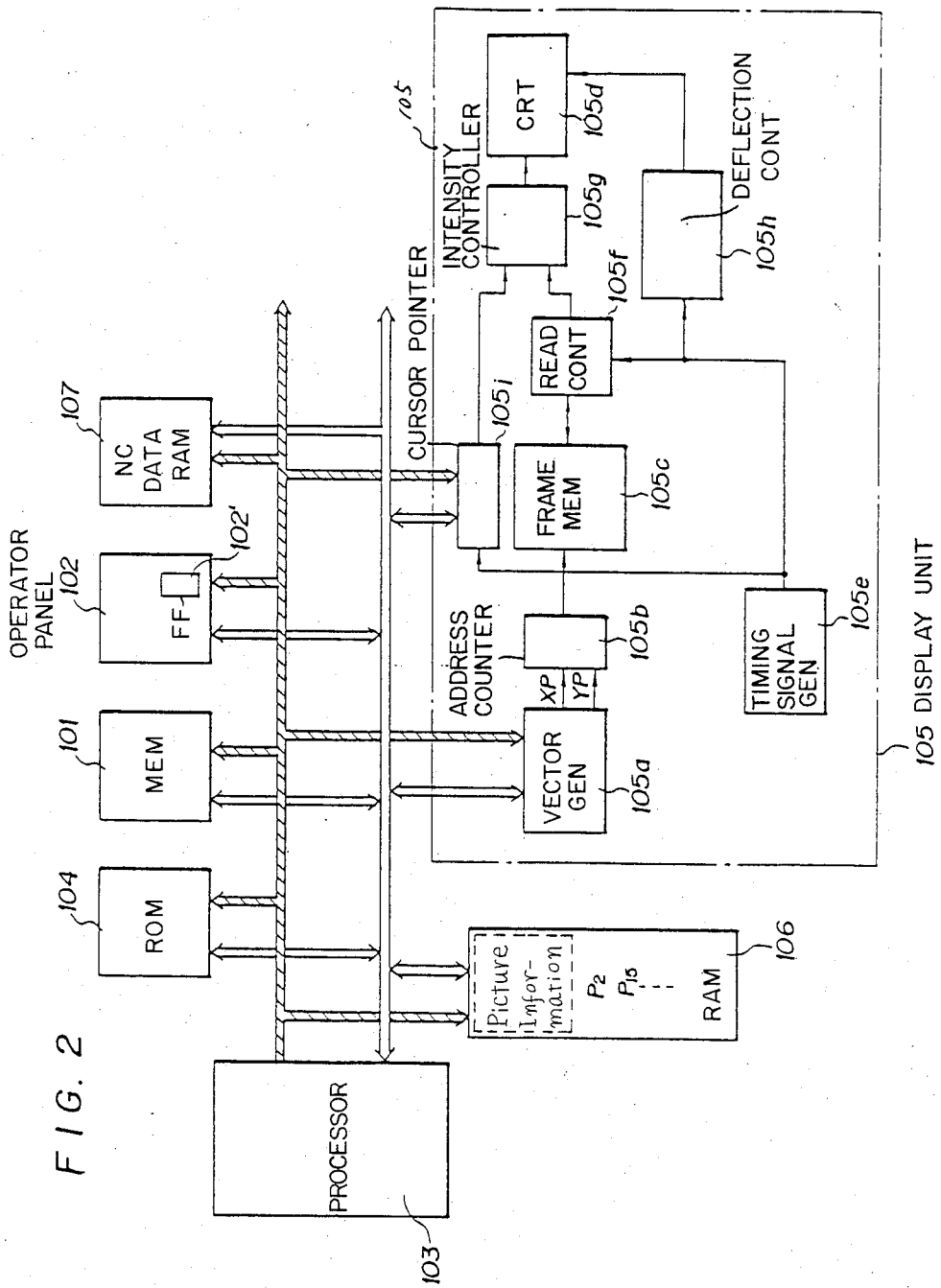
FIG. 2 is a block diagram of an embodiment of a circuit for carrying out the method of the present invention.
Figure 5:
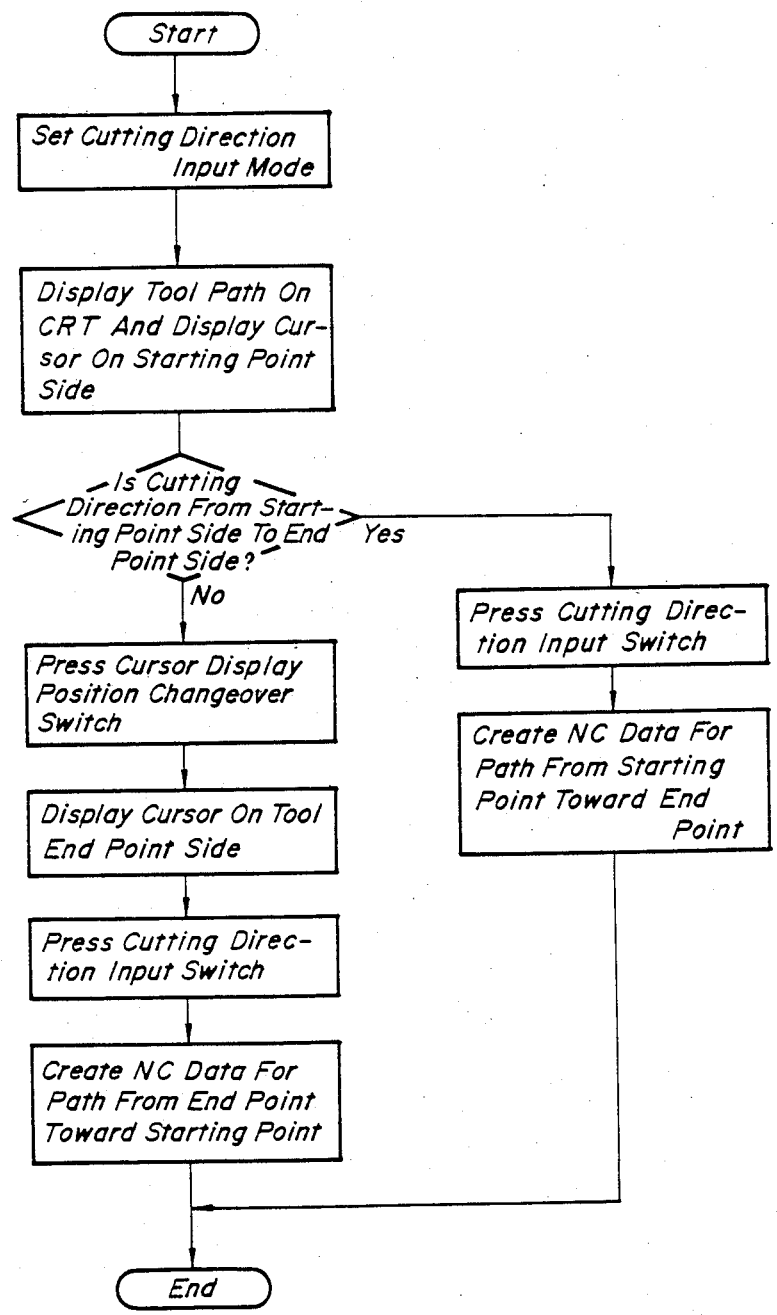
FIG. 5 is a flowchart for processing in accordance with the method of the present invention.

In FIG. 1, $P_1 \rightarrow P_2 \rightarrow P_3 \ldots \rightarrow P_{16}$ represents a path trajectory, and CSR denotes a cursor. The path trajectory is displayed on a display unit 105 by using path data previously created and stored in a memory 101 (FIG. 2). It should be noted that the path data are created based on shape data entered without relation to actual cutting direction.

Figure 4:
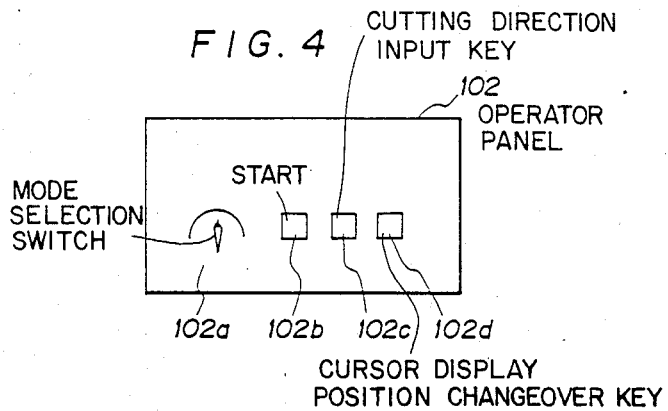
FIG. 4 is a diagram of an operator's panel.

When a mode selection switch 102$a$ (FIG. 4) on an operator panel 102 is set to a cutting direction input mode and a start button 102$b$ is pressed, a processor 103 executes processing for path trajectory display under the control of a control program stored in a ROM 104. Specifically, the processor 103 reads path data out of the memory 101 one block at a time in successive fashion, converts the path data read into picture information which is then stored in a RAM 106, and then, following the conversion processing, applies the picture information (data indicating the distinction between straight lines and circular arcs, as well as starting points and end points, etc.) to a vector generator 105$a$ one item at a time. The vector generator 105$a$ uses the picture information input to perform an ordinary linear or circular interpolation calculation, thus to generate interpolated pulses XP, YP along the respective axes, which pulses are applied to an address counter 105$b$. The latter has two address counters, one for the X and the other for the Y axis. These count the interpolated pulses XP, YP along the respective axes and write a "1" into a storage location of a frame memory 105$c$, which is designated by the X- and Y-axis address counters each time. The frame memory 105$c$ is of matrix construction and has one-bit storage locations corresponding to the pixel positions of a cathode-ray tube display screen 105$d$. Each time an interpolation pulse is generated, a "1" is written into a storage location at a matrix cross point designated by the X- and Y-axis address counters. When a path trajectory has been stored in the frame memory 105$c$ by the foregoing processing, the stored information is subsequently read out of the frame memory 105$c$ in synchronism with the vertical and horizontal deflection of the CRT beam (this is referred to as raster scanning), and intensity modulation is performed using the stored information to display the tool path trajectory on the cathode-ray tube 105$d$. It should be noted that a timing signal generator 105$e$ produces a timing signal for reading the stored information out of the frame memory 105$c$, and a timing signal (vertical and horizontal synchronizing signals) for deflecting the beam. A read controller 105$f$ reads the stored information out of the frame memory 105$c$ on the basis of the timing signal, and an intensity controller 105$g$ performs intensity modulation based on the stored information. A deflection controller 105$h$ deflects the beam horizontally and vertically on the basis of the timing signal.

At the same time that the aforementioned path trajectory is generated, e.g., the end point $P_2$ of the first path block $b_1$ and the starting point $P_{15}$ of the last path block $b_{15}$ are stored in the RAM 106. Next, the processor 103 reads position data $(X_2, Y_2)$ of the point $P_2$ stored in the RAM 106 and applies cursor display area data in accordance with the points $P_2$ to a cursor (i.e., address) point 105*i*. Let us assume that the horizontal and vertical dimensions of the cursor are W. The cursor display area data in such case will be the position $X_{c1}$ $(=X_2)$ of the left edge of the cursor, the position $X_{c2}$ $(=X_2+W)$ of the right edge of the cursor, the position $Y_{c1}$ $(=Y_2)$ of the upper edge of the cursor, and the position $Y_{c2}$ $(=Y_2-W)$ of the lower edge of the cursor.

Since the timing signal from the timing signal generator 105*e* is also applied to the address pointer 105*i*, the latter is capable of recognizing the beam position. Therefore, when the beam position arrives at the cursor display area on the cathode-ray tube, the address pointer 105*i* applies a cursor display signal to the intensity controller 105*g* to display the cursor.

Figure 3:
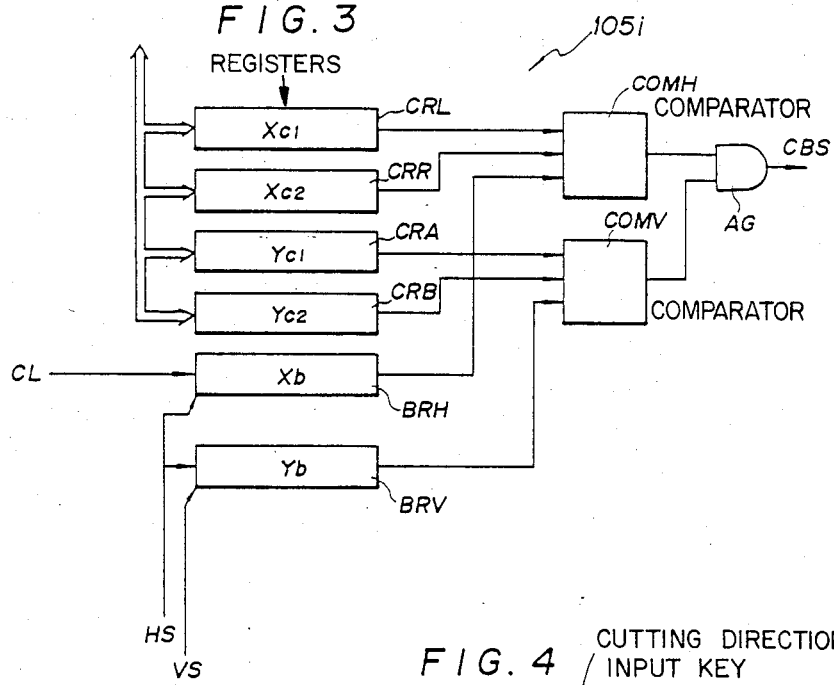
FIG. 3 is a block diagram of the cursor pointer 105$i$ of FIG. 2.

FIG. 3 is a block diagram of the cursor pointer 105*i*. The left and right-edge positions $X_{c1}$, $X_{c2}$ of the cursor are stored in registers CRL, CRR, respectively, and the upper and lower-edge positions $Y_{c1}$, $Y_{c2}$ of the cursor are stored in registers CRA, CRB, respectively. A register BRH has its status cleared by a horizontal sychronizing signal HS and counts clock pulses CL following generation of the horizontal synchronizing signal to monitor the position $X_b$ of the beam in the horizontal direction. A register BRV has its status cleared by a vertical synchronizing signal VS and counts the number of horizontal synchronizing signals HS following generation of the vertical synchronizing signal to monitor the position $Y_b$ of the beam in the vertical direction. A comparator COMH determines whether the following relation holds:

$$X_{c1} \leq X_b \leq X_{c2} \qquad (1)$$

and a comparator COMV determines whether the following relation holds:

$$Y_{c1} \leq Y_b \leq Y_{c2} \qquad (2)$$

When the relations (1) and (2) hold, an AND gate AG produces a high-level cursor display signal CBS. Accordingly, the cursor pointer 105*i* produces the cursor display signal CBS during the time that the beam resides in the cursor display area, in response to which the cursor is displayed at the point $P_2$. The cursor pointer 105*i* produces the cursor display signal on and off with every n-frame scan, thereby causing the cursor to blink. In the case described hereinabove, cursor display area data are generated and the cursor display signal CBS is produced to display the cursor on the cathode-ray tube when the beam arrives at the cursor display area. It should be noted, however, that an arrangement is possible wherein a cursor pattern is read out of a character generator (not shown), the cursor pattern is stored at a predetermined location of a character frame memory (not shown) designated by the point $P_2$, and the stored information (cursor pattern) is read out of the character frame memory to display the cursor on the cathode-ray tube 105*d*.

Initially, the cursor CSR designates the point $P_2$, that is, the stating point side of a path (FIG. 1). Under this condition, the operator decides whether or not cutting is to be performed from the starting point side toward the end point side.

If cutting is to be performed from the starting point side toward the end point side, a cutting direction input key 102*c* on the operator's panel is pressed. In response to pressing of the cutting direction input key 102*c*, the processor 103 uses the path data to create NC data for a path along which cutting progresses from the starting point $P_1$ toward the end point $P_{16}$, with the data being stored in a RAM 107.

If cutting is to be performed from the end point side toward the starting point side, a cursor display position changeover key 102*d* on the operator's panel is pressed, thereby setting a J-K flip-flop 102' (FIG. 2) incorporated within the operator panel 102. When the cursor display position changeover key 102*d* has been pressed to set the flip-flop 102', the processor 103 reads the position data of point $P_{15}$ out of the RAM 106 and, in the manner described above, applies the cursor display area data to the cursor pointer 105*i* and, by means of the cursor CSR, indicates the position of the point $P_{15}$, namely the position on the end point side, on the cathode-ray tube 105*d*.

Next, when the cutting direction input key 102*c* on the operator's panel is pressed, the processor 103 uses the path data stored in the memory 101 to create NC data in such a manner that cutting proceeds from the end point side to the starting point side, i.e., in a direction in which cutting progresses along the path $P_{16} \rightarrow P_{15} \rightarrow \ldots \rightarrow P_2 \rightarrow P_1$. The processor stores the NC data in the RAM 107.

It should be noted that the J-K flip-flop 102' incorporated within the operator panel 102 is set or reset (the initial state being the reset state) as the cursor display position changeover key 102*c* is pressed. The processor 103 indicates the path position (point $P_2$) on the starting point side by the cursor when the reset state holds, and indicates the path position (point $P_{15}$) on the end point side by the cursor when the set state holds. Note that it can be arranged for the cursor to indicate an intermediate point on a path rather than a starting point or end point.

According to the present invention, a machining program can be created by entering shape data without taking actual cutting direction into consideration. This simplifies the entry of the shape data. Further, according to the present invention, the arrangement is such that a path trajectory is displayed on a cathode-ray tube and a cutting direction is entered by appropriately indicating a path position on a starting point side and a path position on an end point side by a cursor. This makes it possible to simplify the specification and entry of the cutting direction. The present invention is therefore well-suited for application to an automatic programming apparatus for creating NC data automatically.

What is claimed is:

1. A cutting direction input method for determining a path cutting direction in an automatic programming system, comprising steps of:
   (a) displaying a path trajectory comprising a number of path blocks on a display screen based on path data;
   (b) indicating one of a path starting point side and a path end point side using a cursor;
   (c) entering cutting direction information by operating a cutting direction input switch when the path starting point side is being indicated by the cursor, in a case where cutting is to be performed from the path starting point toward the path end point; and
   (d) entering cutting direction information by operating the cutting direction input switch when the path end point side is being indicated by the cursor, in a case where cutting is to be performed from the path end point toward the path starting point.

2. A cutting direction input method according to claim 1, further comprising the steps of:
   (e) providing a cursor display position changeover switch; and
   (f) selectively changing over a cursor display position to the starting point side or the end point side by using the cursor display position changeover switch.

3. A cutting direction input method according to claim 2, wherein in said step (b), a position on the starting point side indicated by the cursor is an end point of a first block of the path trajectory, and a position on the end point side indicated by the cursor is a starting point of a final block of the path trajectory.

4. A cutting direction input method according to claim 3, wherein the positions indicated by the cursor on the starting point and end point sides are obtained from the path data.

5. A cutting direction input method according to claim 1, further comprising a step of creating NC data from the path data and the entered cutting direction data.

6. An automatic programming method for creating a numerical control tape, comprising the steps of:
   (a) entering shape data based on a design drawing, independently of the actual machining direction;
   (b) displaying a path trajectory on a display screen based on path data corresponding to the shape data, the path trajectory comprising a number of path blocks;
   (c) indicating one of a path starting point side and a path end point side using a cursor;
   (d) entering machining direction information by generating a first signal when the path starting point side is being indicated by the cursor if machining is to be performed from the path starting point toward the path end point, and by generating a second signal when the path end point is being indicated by the cursor if cutting is to be performed from the path end point toward the path starting point; and
   (e) creating NC data from the path data and the entered machining direction information.

7. An automatic programming method according to claim 6, wherein said step (c) comprises obtaining the positions indicated by the cursor on the starting point and end point sides based on the path data.

* * * * *